(12) United States Patent
Cuer et al.

(10) Patent No.: US 11,365,462 B2
(45) Date of Patent: Jun. 21, 2022

(54) MESOPOROUS ORGANIC MATERIAL, USEFUL IN PARTICULAR FOR EXTRACTING URANIUM(VI) FROM AQUEOUS MEDIA INCLUDING PHOSPHORIC ACID, AND USES THEREOF

(71) Applicants: ORANO MINING, Châtillon (FR); COMMISSARIAT À L'ÉNERGIE ATOMIQUE ET AUX ÉNERGIES ALTERNATIVES, Paris (FR)

(72) Inventors: Frédéric Cuer, Cornillon (FR); Manon Marbet, Bedarrides (FR); Cécile Marie, Avignon (FR)

(73) Assignees: ORANO MINING, Châtillon (FR); COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 539 days.

(21) Appl. No.: 16/467,341

(22) PCT Filed: Dec. 13, 2017

(86) PCT No.: PCT/FR2017/053549
§ 371 (c)(1),
(2) Date: Jun. 6, 2019

(87) PCT Pub. No.: WO2018/109382
PCT Pub. Date: Jun. 21, 2018

(65) Prior Publication Data
US 2019/0316226 A1 Oct. 17, 2019

(30) Foreign Application Priority Data
Dec. 13, 2016 (FR) ...................................... 1662377

(51) Int. Cl.
C22B 60/02 (2006.01)
C02F 1/28 (2006.01)
C08J 9/26 (2006.01)
C02F 101/00 (2006.01)

(52) U.S. Cl.
CPC .......... *C22B 60/0265* (2013.01); *C02F 1/285* (2013.01); *C08J 9/26* (2013.01); *C22B 60/0243* (2013.01); *C02F 2101/006* (2013.01); *C02F 2209/06* (2013.01); *C02F 2303/16* (2013.01); *C08J 2201/0462* (2013.01); *C08J 2201/0464* (2013.01); *C08J 2205/042* (2013.01); *C08J 2300/104* (2013.01); *C08J 2300/106* (2013.01); *C08J 2325/18* (2013.01); *C08J 2471/02* (2013.01)

(58) Field of Classification Search
CPC . C22B 60/02; C22B 60/0265; C22B 60/0243; C02F 1/285; C02F 2101/006; C02F 2209/06; C02F 2303/16; C08J 9/26; C08J 2201/0462; C08J 2201/0464; C08J 2205/042; C08J 2300/104; C08J 2300/106; C08J 2325/18; C08J 2471/02
USPC ............................................................ 423/7
See application file for complete search history.

(56) References Cited

U.S. PATENT DOCUMENTS

2015/0133688 A1  5/2015 Arrachart et al.
2016/0289796 A1 10/2016 Grandjean et al.

FOREIGN PATENT DOCUMENTS

FR   2990206 A1   11/2013
WO  2014127860 A1  8/2014

OTHER PUBLICATIONS

International Search Report for PCT/FR2017/053549 dated Feb. 1, 2018.
Written Opinion for PCT/FR2017/053549 dated Feb. 1, 2018.
French Search Report for application No. FR 1662377 dated Oct. 13, 2017.
Raju, Siva Kesava et al.: "Sequential separation of lanthanides, thorium and uranium using novel solid phase extraction method from high acidic nuclear wastes", In: Journal of Hazardous Materials, Jun. 6, 2007, vol. 145, No. 1-2, pp. 315-322.
Akhila Maheswari, M., "Selective enrichment of U(VI), Th(IV) and La(III) from high acidic streams using a new chelating ion-exchange polymeric matrix" In: Talanta, Sep. 1, 2004, vol. 64, No. 1, pp. 202-209.
Turgis, Raphael et al. "Uranium Extraction from Phosphoric Acid Using Bifunctional Amido-Phosphonic Acid Ligands" In: Solvent Extraction and Ion Exchange, Jul. 29, 2014, vol. 32, No. 5, pp. 478-491.
Kabay, Nalan et al. "Recovery of Uranium from Phosphoric Acid Solutions Using Chelating Ion-Exchange Resins +" In: Industrial & Engineering Chemistry Research, May 1, 1998, vol. 37, No. 5, pp. 1983-1990.

(Continued)

*Primary Examiner* — Edward M Johnson
(74) *Attorney, Agent, or Firm* — Pearne & Gordon LLP (57) ABSTRACT

A mesoporous organic material which makes it possible to extract, using the liquid-solid extraction technique, the uranium(VI) contained in an aqueous medium including phosphoric acid, with high efficiency and high selectivity for the iron that the medium can likewise contain. The material is likely to be obtained by cross-linking polymerisation of a monomer of formula (I) below, wherein: $R^1$, $R^2$ and $R^3$ are, independently from one another, H, a $C_1$ to $C_{12}$ saturated or unsaturated, linear or branched hydrocarbon group, or a polymerisable group, with the condition that at least one of $R^1$, $R^2$ and $R^3$ is a polymerisable group; $R^4$ and $R^5$ are, independently from one another, H or a $C_1$ to $C_8$ saturated or unsaturated, linear or branched hydrocarbon group; the cross-linking polymerisation being carried out in the presence of a cross-linking agent and one or more pore-forming agents.

19 Claims, 2 Drawing Sheets

(56) References Cited

OTHER PUBLICATIONS

Jyo, Akinori et al. "Preparation of Phosphoric Acid Resins with Large Cation Exchange Capacities from Macroreticular Poly (glycidyl methacrylate-co-divinylbenzene) Bead and Their Behavior in Uptake of metal Ions", In: Journal of Applied Polymer Science, 1977, vol. 63, pp. 1327-1334.

Yamabe, Kazunori et al. "Metal Ion Selectivity of Macroreticular Chelating Cation Exchange Resins With Phosphonic Acid Groups Attached to Phenyl Groups of a Styrene-Divinylbenzene Copolymer Matrix" In: Separation Science and Technolog, 2001, vol. 36, No. 15, pp. 3511-3528.

MESOPOROUS ORGANIC MATERIAL, USEFUL IN PARTICULAR FOR EXTRACTING URANIUM(VI) FROM AQUEOUS MEDIA INCLUDING PHOSPHORIC ACID, AND USES THEREOF

CROSS-REFERENCE TO RELATED APPLICATIONS

This is a National Stage application of PCT international application PCT/FR2017/053549, filed on Dec. 13, 2017, which claims the priority of French Patent Application No. 16 62377, filed Dec. 13, 2016, both of which are incorporated herein by reference in their entireties.

TECHNICAL FIELD

The invention relates to the field of extraction of uranium (VI) from an aqueous medium comprising phosphoric acid.

More specifically, the invention relates to a mesoporous organic material that can be used with the liquid-solid extraction technique to extract uranium(VI) present in an aqueous medium comprising phosphoric acid, both very efficiently and highly selectively relative to iron that might also be present in this medium.

It also relates to uses of this material to extract uranium (VI) from an aqueous medium comprising phosphoric acid such as a solution derived from attacking a natural phosphate by sulphuric acid, either in view of using this uranium later or in view of purifying the aqueous medium from uranium that is then considered as an impurity.

One particular application of the invention lies in the treatment of natural phosphates in order to use the uranium (VI) present in these phosphates.

STATE OF THE ART

Natural phosphates (or phosphate ores), that are used for the fabrication of phosphoric acid and phosphated fertilisers, contain uranium(VI) in quantities that can vary from a few tens of ppm to several thousands of ppm as well as variable quantities of other metals.

Uranium(VI) present in natural phosphates is almost entirely found in aqueous solutions of phosphoric acid derived from the sulphuric attack of these phosphates. This attack transforms tricalcium phosphate into phosphoric acid $H_3PO_4$ with 30% phosphate anhydride $P_2O_5$ and into insoluble calcium (gypsum) and has the effect of solubilising uranium(VI) and various other metals, and particularly iron that forms the majority metallic impurity.

The potential recovery of uranium(VI) contained in natural phosphates is 14 000 tonnes/year, which is about 25% of the current annual production of uranium, which represents a non-negligible source for the supply of uranium.

Thus, many research teams have taken an interest in the problem of recovery of uranium(VI) from an aqueous solution of phosphoric acid.

Five different techniques have been put forward up to now for this recovery:

1°) (co)precipitation, which consists of forming in situ, that is to say in the aqueous solution of phosphoric acid, solid particles that comprise the uranium(VI) to be recovered, by adding a chemical species in solution, and to collect these solid particles after decantation and filtration;

2°) liquid-liquid extraction, which consists of contacting the aqueous solution of phosphoric acid with an organic solution that comprises one or several extractants in an organic diluent to transfer uranium(VI) from the aqueous solution to the organic solution;

3°) liquid membrane extraction (supported or in emulsion), corresponding to a variation of liquid-liquid extraction with the difference that the organic solution is replaced by a very thin film of an organic liquid with selective permeability;

4°) flotation, which consists of adding to the aqueous solution of phosphoric acid a chemical reagent, called a "collector", that is capable of complexing uranium(VI), to allow the uranium-bearing complexes thus formed to adsorb to the surface of gas bubbles generated by stirring in an appropriate reactor (flotation cell, flotation column, etc.) and then to recover said complexes in the scum resulting from this adsorption;

5°) liquid-solid extraction, which consists of contacting the aqueous solution of phosphoric acid with an organic or inorganic solid material, that is insoluble in water and is functionalised by chemical groups capable of extracting uranium(VI) from the aqueous solution, either by ion exchange or by complexation.

The invention relates to this fifth technique.

There are three methods of functionalising a solid material in view of using it in a liquid-solid extraction, namely:

impregnation, which consists of contacting the material with a solution in which an extractant has previously been solubilised and then evaporating the solvent so as to leave only the extracting agent on the surface of the material;

post-grafting, which consists of fixing an extractant by covalent bonds to the surface of the material after its synthesis, like, for example, the post-grafting which is described in the International application PCT WO 2014/127860 (reference [1]); and cross-linking, which consists of polymerising a compound comprising an extracting moiety and at least one polymerisable group such that the chemical groups necessary for the extraction are part of the structure of the material.

Cross-linking serves two purposes: firstly to increase the exchange capacity of solid materials and secondly to avoid the disadvantages of the other two functionalisation modes in general, namely:

in the case of materials functionalised by impregnation: a weak restraint of the extractant on the surface of the materials;

in the case of materials functionalised by post-grafting: a potential presence of chemical groups that can penalise extraction performances and that correspond to Cl, $NH_2$ or other types of chemical groups that did not react during the post-grafting step.

However, at the present time, the application fields targeted by the development of materials functionalised by cross-linking are only very slightly oriented towards the recovery of uranium(VI) and, a fortiori, when the uranium concentration is very low in an extremely complexing aqueous solution such as an aqueous solution of phosphoric acid derived from the sulphuric attack of natural phosphates.

Furthermore, the performance of the rare materials functionalised by cross-linking from phosphoric or phosphinic moieties drops sharply, with a reduction in their extraction capacity, when the concentration of phosphoric acid exceeds 1 mol/L. This makes them unsuitable for the extraction of uranium(VI) from aqueous solutions of phosphoric acid derived from the sulphuric attack of natural phosphates considering that this type of solution typically has a concentration of phosphoric acid equal to more than 1 mol/L and in the vast majority of cases equal to 5 mol/L. A total lack of selectivity in favour of cations acting as Lewis acids—which is the case of the uranyl cation—should also be noted (for example, see Yamabe et al., *Separation Science and Technology* 2001, 36(15), 3511-3528, reference [2]; Jyo et al., *Journal of Applied Polymer Science* 1997, 63, 1327-1334, reference [3]).

However, in the context of their work, the Inventors have observed that, unlike what is taught in the state of the art, mesoporous solid materials obtained by cross-linking polymerisation of amidophosphonate or amidophosphonic bifunctional compounds allow extracting uranium(VI) from an aqueous medium comprising phosphoric acid very efficiently and with a high selectivity with regard to iron that might be present in this solution, even for concentrations of phosphoric acid very much higher than 1 mol/L.

They also observed that these materials have a much higher extraction capacity than materials obtained by post-grafting of a bifunctional compound of the same type on an inorganic support as described in reference [1].

The invention is based on these observations.

Presentation of the Invention

Therefore, the purpose of the invention is firstly a mesoporous organic material obtainable by a cross-linking polymerisation of a monomer of formula (I) below:

(I)

in which:

$R^1$, $R^2$ and $R^3$, independently of each other, represent a hydrogen atom, a saturated or unsaturated, linear or branched hydrocarbon group comprising 1 to 12 carbon atoms or a polymerisable group comprising at least one unsaturation, provided that at least one of $R^1$, $R^2$ and $R^3$ is a polymerisable group;

$R^4$ and $R^5$, independently of each other, represent a hydrogen atom or a saturated or unsaturated, linear or branched hydrocarbon group comprising 1 to 8 carbon atoms; the cross-linking polymerisation being made in the presence of a cross-linking agent and one or several blowing agents.

In the above, a material is deemed to be mesoporous when more than 40% by volume and even better more than 50% by volume of the pores of this material are mesopores, i.e. pores with a diameter of between 2 nm and 50 nm (limits included) in accordance with the definition of the International Union of Pure and Applied Chemistry.

In other words, a material is deemed to be mesoporous when the volume occupied by the mesopores of this material represents more than 40% and preferably more than 50% of the pore total volume of said material.

The pore total volume of the material and the mesopore volume of this material are determined by nitrogen porosimetry (nitrogen adsorption/desorption isotherm at 77K, with a relative pressure $P/P_0$ varying from $10^{-9}$ to 1) using a Micromeritics 3Flex™ type porosity analyser and by applying the Barrett-Joyner-Halenda method (or BJH method) as described in *Journal of the American Chemical Society* 1951, 73(1), 373-380 (reference [4]).

Moreover, the term "saturated or unsaturated, linear or branched hydrocarbon group comprising 1 to 12 carbon atoms" refers to any alkyl, alkenyl or alkynyl group with a linear or modified chain that comprises at least 1 carbon atom (when it is an alkyl group) or at least 2 carbon atoms (when it is an alkenyl or alkynyl group) but that does not comprise more than 12 carbon atoms. Therefore such a group comprises 1 carbon atom, 2 carbon atoms, 3 carbon atoms, 4 carbon atoms, etc., and up to 12 carbon atoms inclusive. Among these groups, preference is given to linear or branched alkyl groups.

Similarly, the term "saturated or unsaturated, linear or branched hydrocarbon group comprising 1 to 8 carbon atoms" refers to any alkyl, alkenyl or alkynyl group with a linear or modified chain that comprises at least 1 carbon atom (when it is an alkyl group) and at least two carbon atoms (when it is an alkenyl or alkynyl group) but that does not comprise more than 8 carbon atoms. Therefore such a group comprises 1 carbon atom, 2 carbon atoms, 3 carbon atoms, 4 carbon atoms, etc., and up to 8 carbon atoms inclusive. In this case also, preference is given to linear or branched alkyl groups.

According to the invention, the unsaturation of the polymerisable group may be an ethylene unsaturation (i.e. with a double C=C bond) or an acetylene unsaturation (i.e. with a triple C≡C bond), preference being given to an ethylene unsaturation.

Advantageously, the polymerisable group complies with one of the formulas (a), (b), (c), (d), (e), (f) and (g) below:

(a)

(b)

(c)

(d)

(e)

(f)

(g)

in which:

p is an integer varying from 1 to 6;
q is an integer varying from 0 to 12; while
X represents a group of formula (i) or (ii) below:

(i)

(ii)

in which:

$R^a$, $R^b$ and $R^c$, independently of each other, represent a hydrogen atom or a linear or branched alkyl group comprising 1 to 10 carbon atoms and even better 1 or 2 carbon atoms (typically methyl or ethyl); and represents the covalent bond by which X is bonded to the rest of the group of formula (a), (b), (c), (d), (e), (f) or (g) above.

Preferably, X complies with formula (ii) in which $R^a$, $R^b$ and $R^c$ all three represent a hydrogen atom such that the polymerisable group comprises a styrenyl group -Ph-CH=CH$_2$, capable of conferring a particularly high resistance to acids and bases to the material.

It is even more preferred that the polymerisable group complies with formula (a) and that, in this formula, q varies from 1 to 4 and X complies with formula (ii) in which $R^a$, $R^b$ and $R^c$ all three represent a hydrogen atom. In this case, the group of atoms $CR^aR^b=CR^c$—is preferably in a para position relative to the —CH$_2$— group to which the phenyl group is bonded.

Thus, in particular the polymerisable group can comply with formula (a1) given below:

in which represents the covalent bond by which this polymerisable group is bonded to the rest of the monomer of formula (I).

According to the invention, the monomer preferably complies with formula (I) in which:
$R^1$ and $R^2$, independently of each other, represent a hydrogen atom, a saturated or unsaturated, linear or branched hydrocarbon group comprising 1 to 12 carbon atoms;
$R^3$ represents a polymerisable group; and
$R^4$ and $R^5$ are as defined above.

It is even more preferred that the monomer complies with formula (I) in which:
$R^1$ and $R^2$ are identical to each other and represent a linear or branched alkyl group comprising 1 to 12 carbon atoms and even better 1 to 6 carbon atoms, the ethyl and n-butyl groups being particularly preferred;
$R^3$ represents a polymerisable group; and
$R^1$ and $R^5$, independently of each other, represent a hydrogen atom or a linear or branched alkyl group comprising 1 to 8 carbon atoms and even better 1 to 4 carbon atoms, the ethyl and n-butyl groups being once again particularly preferred.

For example, such a monomer complies with formula (I) in which $R^1$ and $R^2$ represent an ethyl group, $R^3$ represents a polymerisable group of formula (a1), $R^4$ represents an ethyl group while $R^5$ represents a hydrogen atom.

The cross-linking agent may be any compound comprising at least two unsaturated groups each capable of reacting with a polymerisable group of two different molecules of the monomer to enable the formation of bridges between the chains derived from polymerisation of the monomer.

Advantageously, this cross-linking agent is chosen from polyvinyl derivatives of benzene or of naphthalene such as a divinylbenzene (for example, 2,4-divinylbenzene), a trivinylbenzene (for example, 1,2,4-trivinylbenzene), a divinylnaphthalene (for example, 1,8-divinylnaphthalene), a divinylalkylbenzene (for example, 1,2-divinyl-3,4-dimethylbenzene), preference being given to 1,4-divinylbenzene.

Typically, the monomer and the cross-linking agent are used in proportions by mass varying from 99:1 to 40:60.

According to the invention, the cross-linking polymerisation of the monomer is preferably done in the presence of a first blowing agent (1) that is an organic solvent in which the monomer and the cross-linking agent are soluble, such as cyclohexane or toluene, and a second blowing agent (2) that is a polymer such as a polyethylene glycol, a polypropylene glycol, a mono- or dialkylic ether of polyethylene glycol, a polyvinylpyrrolidone, tert-amylic alcohol or a mixture thereof. The blowing agents (1) and (2) are used in proportions such that a mesoporosity can be obtained.

Thus for example, the use of toluene in association with polypropylene glycol, particularly in the proportion by mass equal to 96:4, is found to be particularly suitable for obtaining a mesoporosity.

Also preferably, the cross-linking polymerisation is a suspension polymerisation, that is to say which uses two phases immiscible with each other, namely:
- a dispersed phase—or organic phase—that comprises the monomer, the cross-linking agent, a polymerisation primer (such as azobisiso-butyronitrile, 2,2-azobis(2-amidinopropane) hydrochlorate, benzoyl peroxide or analogues) and the blowing agent(s) in solution in an organic solvent, on the understanding that, as specified above, the organic solvent can be one of the blowing agents; and
- a dispersing phase—or aqueous phase—that comprises a dispersing agent (such as sodium chloride) and an emulsifying agent (such as polyvinyl alcohol) in solution in water.

Thus for example, the dispersed phase comprises the monomer, 1,4-divinylbenzene, azobisisobutyronitrile and polypropylene glycol in solution in toluene, while the dispersing phase comprises sodium chloride and a polyvinyl alcohol in solution in water.

After mixing the two phases and emulsification of the mix, for example for one hour under an inert atmosphere (such as an argon flow), the polymerisation is done by maintaining the emulsion, for example at a temperature of 80° C., for several hours, for example 5 hours, also under an inert atmosphere.

The polymer thus obtained, typically in the form of balls, is recovered, washed, advantageously subjected to a Soxhlet type extraction, and then dried in a drying oven.

The material of the invention has demonstrated a particularly high capacity to extract uranium(VI) present in an aqueous medium as well as a good selectivity for uranium (VI) relative to iron which represents the metal impurity predominantly present in the aqueous solutions resulting from the attack of natural phosphates by sulphuric acid.

Thus, another purpose of the invention is the use of a mesoporous organic material as previously defined to extract uranium(VI) from an aqueous medium comprising phosphoric acid and uranium(VI), and more specifically from an aqueous solution resulting from the attack of a natural phosphate by sulphuric acid.

According to the invention, this aqueous medium may comprise a very wide range of concentrations of phosphoric acid, and particularly concentrations of phosphoric acid varying from 0.01 mol/L to 9 mol/L.

It may further comprise iron.

Extraction of uranium(VI) from an aqueous medium comprising phosphoric acid by means of a material of the invention is extremely simple to implement because all that is necessary is to contact this material with the aqueous medium, for example in a stirred reactor or in a column, for sufficiently long time to allow the uranium(VI) to be complexed by the material, and then to separate this material from the aqueous medium.

Typically, 0.5 to 1.5 kg of material is used for 500 L to 1500 L of aqueous medium.

Depending on the objective for which uranium(VI) is extracted from the aqueous medium (recovery of uranium (VI) for exploitation or purification of the aqueous medium with regard to uranium(VI)), it is then possible to strip uranium(VI) from the material of the invention, for example by means of an acid aqueous solution such as an aqueous solution of concentrated sulphuric acid, for example with a concentration of 5 mol/L of sulphuric acid, or by means of a basic aqueous solution such as an aqueous solution of sodium carbonate or ammonium carbonate.

Thus, another purpose of the invention is a method for recovering uranium(VI) present in an aqueous medium comprising phosphoric acid, which method comprises:

a) an extraction of uranium(VI) from the aqueous medium by a mesoporous organic material as previously defined, the extraction comprising contacting the aqueous medium with the material, and then separating the aqueous medium from the material;

b) a stripping of uranium(VI) from the material obtained at the end of step a), the stripping comprising contacting the material with an acid or basic aqueous solution, and then separating the material from the basic aqueous solution.

As before, this aqueous medium may include from 0.01 mol/L to 9 mol/L of phosphoric acid, and may further comprise iron.

In this method, the aqueous medium comprising phosphoric acid is advantageously an aqueous solution resulting from the attack of a phosphate by sulphuric acid.

Other advantages and characteristics of the invention will become clear after reading the remaining description given below, which relates to examples of the preparation of materials of the invention and examples to demonstrate the properties of these materials.

Obviously, these examples are only given to illustrate the purposes of the invention and in no way form a limitation of these purposes.

BRIEF DESCRIPTION OF THE FIGURES

FIG. 3 shows a curve illustrating the volume distribution of pore diameters (semi-logarithmic dV/d log(D) function, expressed in $cm^3/g \cdot Å$, as a function of the pore diameter, noted D and expressed in Å), as determined by adsorption-desorption of nitrogen by applying the BJH method, for a material with the same chemical composition as the materials for which FIGS. 1 and 2 are applicable, but that is different in that it is microporous.

DETAILED PRESENTATION OF PARTICULAR EMBODIMENTS

Example 1: Preparation of Materials of the Invention

Material M1:

A first material of the invention, referred to as material M1 hereinafter, is prepared by cross-linking polymerisation of the amidophosphonate of formula below:

and divinylbenzene (or DVB).

This polymerisation is made in suspension, that is to say by a method using two phases immiscible with each other, namely:

a dispersed phase—or organic phase—comprising monomers (i.e. the amidophosphonate and DVB), azobisisobutyronitrile (or AIBN) as a primer, and polypropylene glycol (or PPG) as a polymer blowing agent, in solution in toluene, the toluene acting as both solvent and blowing agent; and a dispersing phase—or aqueous phase—comprising polyvinyl alcohol (or PVA) as an emulsifying agent, and sodium chloride as a dispersing agent, in solution in water.

To achieve this, the first step is to prepare the dispersing phase that has the composition presented in Table I below.

TABLE I

| Component | Quantity by mass (g) |
|---|---|
| Water | 154.5 |
| NaCl | 5.1 |
| | (i.e. a NaCl/water mass ratio of 3.30%) |
| PVA | 1.16 |
| (Sigma-Aldrich, ref.: 363073) | (i.e. a PVA/water mass ratio of 0.75%) |

This dispersing phase is then placed in a 2-neck flask that is kept stirred (using a 5 cm half-moon stirring paddle) while scavenging the flask with argon to eliminate all traces of oxygen from said dispersing phase.

The next step is to prepare the dispersed phase that has the composition presented in Table II below.

TABLE II

| Component | Quantity by mass (g) |
|---|---|
| Toluene | 3.113 |
| Amidophosphonate | 2.32 |
| | (i.e. an amidophosphonate/monomer mass ratio of 89.4%) |
| DVB (degree of purity: 80%) (Sigma-Aldrich, ref.: 414565) | 0.343 |
| | (i.e. a DVB/monomer mass ratio of 10.6%) |
| AIBN (Molekula) | 0.028 |
| | (i.e. an AIBN/monomer molar ratio of 2%) |
| PPG (BASF, Pluriol™ P900) | 0.130 |
| | (i.e. a PPG/toluene mass ratio of 4%) |

The dispersed phase is added to the dispersing phase and the whole is kept stirred and under argon scavenging for 1 hour to obtain a homogeneous emulsion.

Argon scavenging is stopped. The temperature of the emulsion is brought to 80° C. and the emulsion is kept at this temperature for 5 hours to make the cross-linking polymerisation that results in the formation of balls in the reaction medium.

The balls thus formed are recovered by filtration, washed with water, ethanol and acetone successively, and are then subjected to a Soxhlet extraction for 24 hours with acetone to eliminate all traces of polymer blowing agent and solvent. They are then dried in a drying oven heated to 90° C. for 24 hours.

Figure 1:
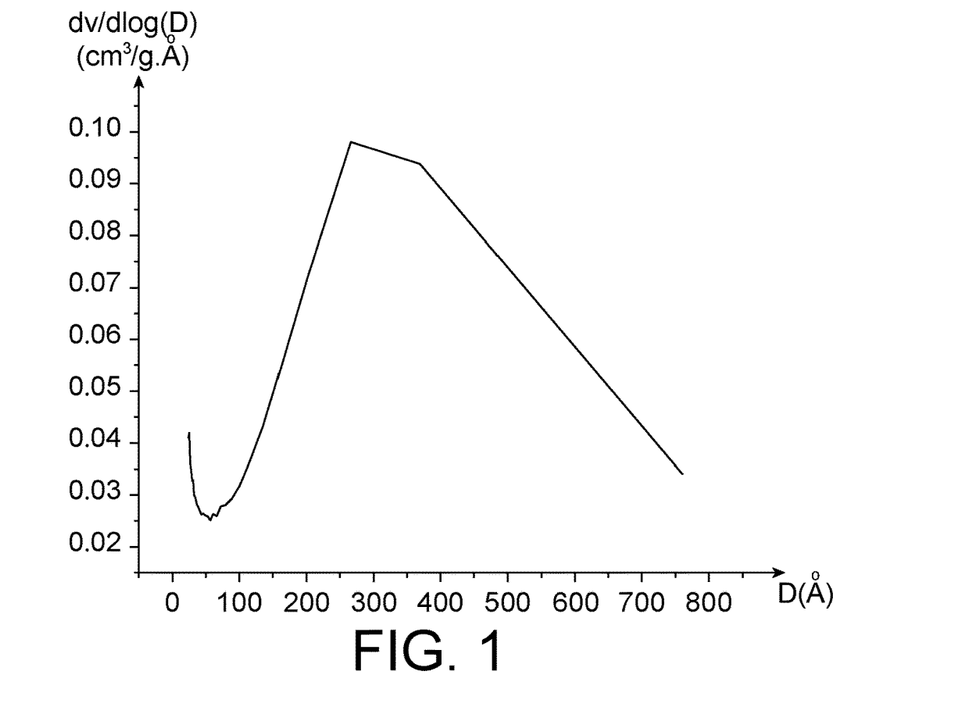
FIG. 1 shows a curve illustrating the volume distribution of pore diameters (semi-logarithmic dV/d log(D) function, expressed in $cm^3/g \cdot Å$, as a function of the pore diameter, noted D and expressed in Å), as determined by adsorption-desorption of nitrogen by applying the Barrett-Joyner-Halenda method (BJH method), for a first material of the invention.

These balls are composed of a material with the following physicochemical characteristics:

average pore diameter (as determined by adsorption-desorption of nitrogen, using the BJH method): 20-40 nm (see FIG. 1);

specific surface area (as determined by adsorption-desorption of nitrogen using the Brunauer-Emmett-Teller method (BET method): 49 m$^2$/g;

molar quantity of amidophosphonate molecules in the material (as determined by an NMR analysis of phosphorus): 1.6 mmol/g of material.

Material M2:

A second material of the invention, referred to as material M2 hereinafter, is prepared using the same protocol as that described above for preparing material M1 except that the dispersing phase which is used has the composition presented in Table III below.

TABLE III

| Component | Quantity by mass (g) |
|---|---|
| Water | 148.30 |
| NaCl | 4.89 |
| | (i.e. a NaCl/water mass ratio of 3.30%) |
| PVA (Sigma-Aldrich, ref.: 363073) | 1.11 |
| | (i.e. a PVA/water mass ratio of 0.75%) |

Figure 2:
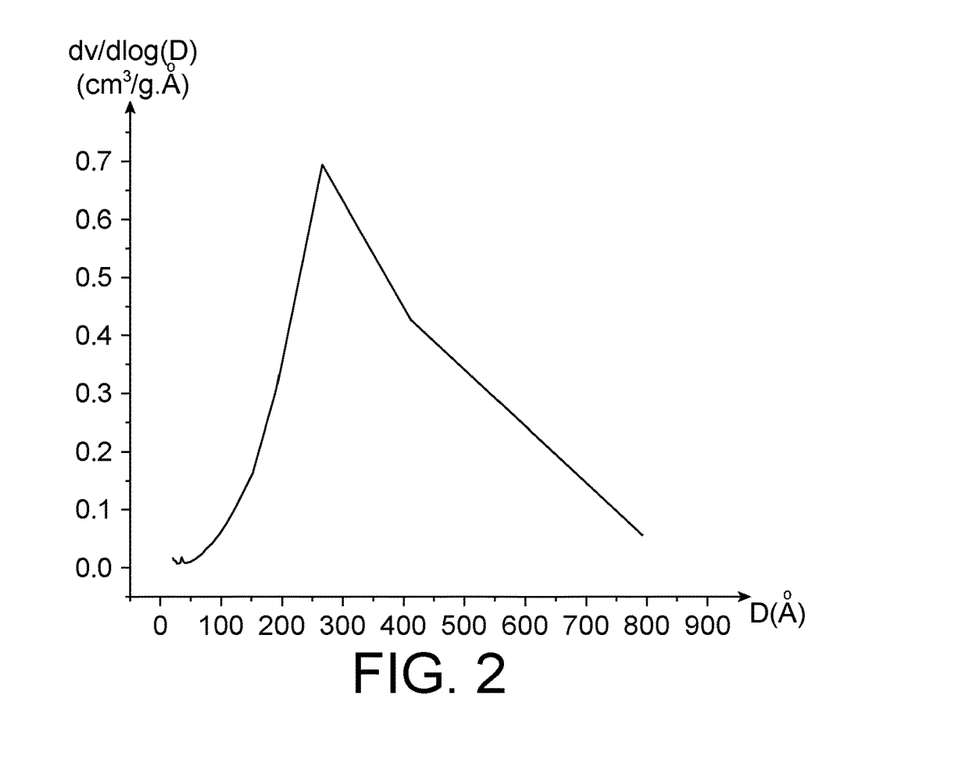
FIG. 2 shows a curve illustrating the volume distribution of pore diameters (semi-logarithmic dV/d log(D) function, expressed in $cm^3/g \cdot Å$, as a function of the pore diameter, noted D and expressed in Å), as determined by adsorption-desorption of nitrogen by applying the BJH method, for a second material of the invention.

Material M2 has the following physicochemical characteristics:

average pore diameter (as determined by adsorption-desorption of nitrogen, using the BJH method): 25-30 nm (see FIG. 2);

specific surface area (as determined by adsorption-desorption of nitrogen using the BET method: 29 m$^2$/g;

molar quantity of amidophosphonate molecules in the material (as determined by an NMR analysis of phosphorus): 1.9 mmol/g of material.

Example 2: Properties of Materials of the Invention 2.1—Extraction of Uranium(VI) from Aqueous Solutions of Phosphoric Acid with a Variable Content of Uranium(VI):

Extraction properties of material M1 were firstly evaluated using an extraction isotherm at 25° C., the objective of which is to determine the quantity of uranium(VI) that is extracted, at equilibrium, from an aqueous solution of phosphoric acid by this material as a function of the concentration of uranium(VI) in this solution initially.

To achieve this, 50 mg samples of material M1 are contacted (by immersion) with 50 mL of a series of aqueous solutions each comprising 5 mol/L of phosphoric acid and 0.01 g/L to 10 g/L of uranium(VI). The dispersions thus obtained are stirred vigorously for 24 hours in a stirrer-incubator to keep them at a constant temperature of 25° C. The samples of material M1 are then recovered by filtration of the dispersions.

Quantities of uranium(VI) present in the filtrates are measured. When these measurements cannot be made because the quantities of uranium(VI) present in the filtrates are too small, the measurements are made on aqueous solutions resulting from the wet mineralisation of samples of material M1, i.e. the dissolution of these samples in nitric acid at 8-10 mol/L under microwaves.

In all cases, the measurements are made by inductively coupled plasma atomic emission spectroscopy (ICP-AES).

For each aqueous solution of phosphoric acid used in the tests, the uranium(VI) extraction capacity of material M1, denoted $Q_U$ and expressed in mg of U(VI)/g of material, is determined:

either by the following formula:

$$Q_U = ([U]_i - [U]_f) \times \frac{V}{m}$$

in which:

[U]$_i$: initial concentration of uranium(VI) in the aqueous solution of phosphoric acid (in mg/L);

[U]$_f$: final concentration of uranium(VI) in the filtrate (in mg/L);

V: volume of the aliquot of the aqueous solution of phosphoric acid in which the material was immersed (in L); and m: mass of the sample of material M1 that was immersed in the aqueous solution of phosphoric acid (in mg);

or by the ratio of the quantity of uranium(VI), as measured by ICP-AES in the aqueous solution of nitric acid derived from the mineralisation of the sample of material M1, to the mass of the sample of material M1 that had been immersed in the aqueous solution of phosphoric acid.

The results obtained are given in Table IV below.

TABLE IV

| [U]$_i$ (g/L) | $Q_U$ (mg/g) |
|---|---|
| 0.01 | 6 |
| 0.03 | 14 |

TABLE IV-continued

| [U]$_i$ (g/L) | Q$_U$ (mg/g) |
|---|---|
| 0.05 | 20 |
| 0.10 | 37 |
| 0.15 | 41 |
| 0.20 | 45 |
| 0.30 | 55 |
| 0.50 | 62 |
| 1 | 67 |
| 5 | 92 |
| 9 | 103 |
| 47 | 118 |
| 64 | 112 |

This table shows that the extraction capacity of material M1 at saturation is equal to 112 mg U(VI)/g of material, which demonstrates that material M1 has an extraction capacity a very much higher than the extraction capacity of materials proposed in the state of the art for extracting uranium(VI) from a medium comprising 5 mol/L of phosphoric acid.

2.2—Extraction of Uranium(VI) from Aqueous Solutions of Phosphoric Acid Comprising Uranium(VI) and Iron:

Extraction properties of material M1 are also evaluated by a series of extraction tests made using three different synthetic aqueous solutions, referred to as S1, S2 and S3 hereinafter, that have uranium(VI) and iron contents representative of aqueous solutions of phosphoric acid actually used in the fabrication of phosphate fertilisers, but for which the concentration of phosphoric acid is varied from 1 mol/L to 9 mol/L.

The composition of solutions S1, S2 and S3 is given in Table V below.

TABLE V

| Aqueous solution | [H$_3$PO$_4$] (mol/L) | [U(VI)] (mg/L) | [Fe] (mg/L) |
|---|---|---|---|
| S1 | 1 | 192 | 1831 |
| S2 | 5 | 189 | 1795 |
| S3 | 9 | 186 | 1796 |

For each solution 51, S2 and S3, extractions are made until material M1 is saturated with uranium(VI).

To that end, 50 mg samples of material M1 are contacted (by immersion) with a 50 mL first aliquot of each of solutions S1, S2 and S3, and then the dispersions obtained are vigorously stirred for 24 hours in a stirrer-incubator to keep them at a constant temperature of 25° C.

Samples of material M1 are then recovered by filtration of the dispersions and are put back into contact (by immersion) for 24 hours, under the same stirring and temperature conditions as before, with a new aliquot of 50 mL of the same solution as before and this protocol is repeated as many times as necessary until the samples of material M1 are saturated with uranium(VI).

Saturation of the samples of material M1 with uranium (VI) is checked by a systematic ICP-AES analysis of uranium(VI) present in the filtrates. A sample of material M1 is deemed to be saturated with uranium(VI) when the filtrate obtained after contacting this sample with an aliquot of aqueous solution has the same content of uranium(VI) as this aliquot.

The uranium(VI) extraction capacity of material M1, denoted $Q_U$ and expressed in mg of U(VI)/g of material, is determined using the same formula as that indicated in item 2.1 above.

The enrichment factor of material M1 with uranium(VI) and iron, denoted $F \cdot E_{Fe}^U$, is determined from quantities of uranium(VI) and iron measured by ICP-AES in aqueous solutions resulting from the wet mineralisation of samples of this material, using the following formula:

$$F.E_{Fe}^U = \frac{Q_U/Q_{Fe}}{[U]_i/[Fe]_i}$$

in which:

$Q_U$: concentration of uranium(VI) in the material at saturation (in mmol/g);

$C_{Fe}$: concentration of iron in the material at saturation (in mmol/g);

$[U]_i$: initial concentration of uranium(VI) in the aqueous solution of phosphoric acid (in mmol/L);

$[Fe]_i$: initial concentration of iron in the aqueous solution of phosphoric acid (in mmol/L).

This enrichment factor provides information about the selectivity of material M1 for uranium(VI) with regard to iron: thus, an enrichment factor of more than 1 indicates selectivity for uranium(VI) with regard to iron, and this selectivity is higher when the enrichment factor is higher.

The results obtained are given in Table VI below.

TABLE VI

| Aqueous solution | Q$_U$ (mg/g) | F.E$_{Fe}^U$ |
|---|---|---|
| S1 | 51 | 44 |
| S2 | 42 | 37 |
| S3 | 24 | 31 |

This table shows that the uranium(VI) extraction capacity and the enrichment factor of material M1 reduce when the concentration of phosphoric acid in the aqueous solution from which uranium(VI) is extracted increases, but nevertheless remain very high for a concentration of phosphoric acid greater than or equal to 5 mol/L.

2.3—Stripping of Uranium(VI) from Materials of the Invention:

The reversibility of material M1, that is to say the possibility of recovering in aqueous solution the uranium (VI) which has been extracted by this material, is evaluated by a stripping test (or elution test) that is made on a sample of material M1 that has previously been loaded with uranium(VI) and iron by three successive contacts (with vigorous stirring for 24 hours and at 25° C.) with aliquots (50 mL) of solution S2 as defined in point 2.2 above.

The uranium(VI) content of this sample is 26.4 mg/g, while its iron content is 7.20 mg/g.

The stripping test consists of contacting (by immersion) the sample of material M1 comprising uranium(VI) and iron with 5 mL of a solution comprising 1 mol/L of ammonium carbonate ((NH$_4$)$_2$CO$_3$), vigorously stirring the dispersion thus obtained for 24 hours in a stirrer-incubator capable of keeping the temperature constant at 25° C., and then recovering the sample of material M1 by filtration.

Quantities of uranium(VI) and iron present in the filtrate are measured by ICP-AES.

The results obtained are given in Table VII.

TABLE VII

|  | U | Fe |
|---|---|---|
| Quantity present on the sample of material M1 before stripping (in mg) | 1.32 | 0.36 |
| Quantity recovered in the filtrate after stripping (in mg) | 1.30 | 0.31 |
| Recovery ratio (in %) | >95 | >86 |

This table shows that uranium(VI) and iron can be quantitatively stripped from the material of the invention simply by contacting this material with a solution of ammonium carbonate at 1 mol/L. Therefore, for the material of the invention, iron is not a "poison" that could limit performances during extraction/stripping cycles.

2.4—Ability of the Materials of the Invention to Achieve Several Extraction/Stripping Cycles:

In order to check if material M1 is capable of retaining its extraction properties after an extraction/stripping cycle, a 50 mg sample of this material is submitted to:
 two successive extraction cycles each comprising three contacts (with vigorous stirring for 24 hours and at 25° C.) of the sample of material M1 with aliquots (50 mL) of an aqueous solution of phosphoric acid, hereinafter referred to as S4, that comprises 5 mol/L of phosphoric acid, 192 mg/L of uranium(VI) and 1797 mg/L of iron, with
 between the two extraction cycles, a stripping (or elution) of uranium(VI) and iron that were extracted from the sample of material M1 during the first extraction cycle, this stripping being made by contacting (with vigorous stirring for 24 hours and at 25° C.) a sample of material M1 with 5 mL of an aqueous solution comprising 1 mol/L of ammonium carbonate.

Quantities of uranium(VI) present in the filtrates obtained at the end of the different contacts are measured by ICP-AES and quantities of uranium(VI) extracted during these contacts are calculated by taking the difference between the quantity of uranium(VI) initially present in the aliquots of solution S4 and the quantities of uranium(VI) thus measured.

For each contact made, the uranium(VI) extraction capacity of material M1, denoted $Q_U$ and expressed in mg of U(VI)/g of material, is determined using the same formula as that indicated in item 2.1 above.

The results obtained are given in Table VIII.

TABLE VIII

|  |  | 1$^{st}$ contact | 2$^{nd}$ contact | 3$^{rd}$ contact |
|---|---|---|---|---|
| $Q_U$ (mg/g) | 1$^{st}$ extraction cycle | 3.9 | 11.5 | 16.7 |
|  | 2$^{nd}$ extraction cycle | 10.3 | 15.4 | 18.4 |

This table shows that during the second extraction cycle, the material of the invention has an ability to extract uranium(VI) which is comparable to its ability during the first extraction cycle.

Therefore, due to its physical and chemical structure, the material of the invention is perfectly resistant to acid and basic solutions such as those used in the first extraction cycle and for the stripping.

Figure 3:
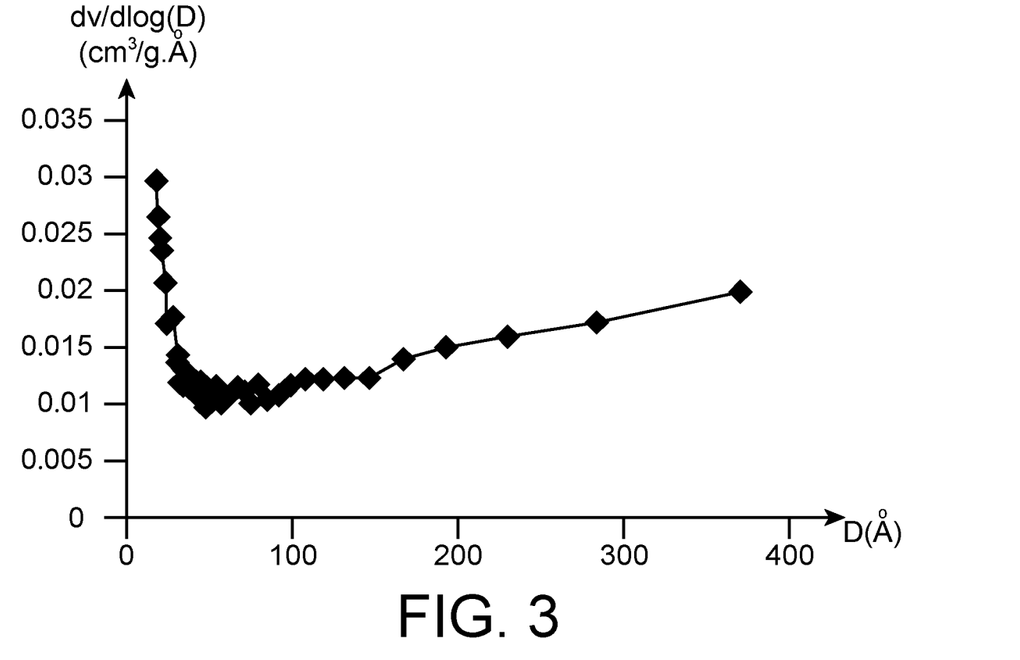

2.5—Influence of the Physical Structure of Materials of the Invention on their Extracting Properties Extraction tests are carried out to compare extraction properties of materials M1 and M2 with the extraction properties of a material, denoted material M3 hereinafter, that has the same chemical composition as materials M1 and M2 but that is microporous (in accordance with the definition of the IUPAC—see FIG. 3) instead of being mesoporous.

Material M3 is obtained using the same operating protocol as that described in example 1 above but using a dispersed phase in which the blowing co-agent, i.e. PPG, is replaced by toluene. Therefore, this dispersed phase has the following composition: toluene: 3.243 g; amidophosphonate: 2.32 g; DVB: 0.343 g; AIBN: 0.028 g.

Extraction tests are performed using two different aqueous solutions of phosphoric acid, namely solution S4 used in example 2.4 above ($H_2PO_4$: 5 mol/L; U(VI): 192 mg/L; Fe: 1797 mg/L) and a solution hereinafter called S5, that comprises 5 mol/L of phosphoric acid, 171 mg/L of uranium(VI) and 1875 mg/L of iron, until saturation of materials M1, M2 and M3.

To that end, a 50.3 mg sample of material M1 and a 51.6 mg sample of material M2 are each contacted (by immersion) with a 50 mL aliquot of solution S4, while a sample of 250 mg of material M3 is contacted (by immersion) with a 10 mL aliquot of solution S5, and then the dispersions obtained are vigorously stirred for 24 hours in a stirrer-incubator to keep them at a constant temperature of 25° C.

Samples of materials M1, M2 and M3 are recovered by filtration and are put back into contact (by immersion) for 24 hours, under the same stirring and temperature conditions as before, with a new aliquot of the same solution as before, and this protocol is repeated as many times as necessary until the samples of materials M1, M2 and M3 are saturated with uranium(VI).

Saturation of the samples of materials M1, M2 and M3 with uranium(VI) is demonstrated by a systematic ICP-AES analysis of uranium(VI) present in the filtrates. As before, a sample of a material is deemed to be saturated with uranium (VI) when the filtrate obtained after contacting this material with an aliquot of aqueous solution has the same content of uranium(VI) as this aliquot.

The uranium(VI) extraction capacity of materials, denoted $Q_U$ and expressed in mg of U(VI)/g of material, is determined using the same formula as that indicated in item 2.1 above.

The enrichment factor of materials M1, M2 and M3 with uranium(VI) and iron, denoted $F \cdot E_{Fe}^{U}$, is determined from quantities of uranium(VI) and iron measured by ICP-AES in aqueous solutions resulting from the wet mineralisation of samples of these materials, using the same formula as that indicated in item 2.2 above.

Table IX below indicates the aqueous solution used, the volume of the aliquot of this aqueous solution ($V_{solution}$), the mass of the sample of tested material, ($M_{sample}$) and the values of $Q_U$ and $F \cdot E_{Fe}^{U}$ obtained, for each of materials M1, M2 and M3.

TABLE IX

| Material | Aqueous solution | $V_{solution}$ (mL) | $M_{sample}$ (mg) | $Q_U$ (mg/g) |
|---|---|---|---|---|
| M1 | S4 | 50 | 50.3 | 58 |
| M2 | S4 | 50 | 51.6 | 56 |
| M3 | S5 | 10 | 250 | 5 |

This table demonstrates the benefit provided by the mesoporosity of the materials of the invention because their extraction power is more than 10 times higher than that of a material with the same chemical composition but with a microporosity.

2.6—Comparison of the Extraction Properties of Materials of the Invention with Those of Materials of the State of the Art:

Comparison with Commercial Ion-Exchange Resins:

Extraction tests were made to compare the extraction properties of material M1 with those of chelating ion-exchange resins that are marketed under the names Amberlite™ IRC 747 (Dow), Lewatit™ TP 260 (Lanxess), Diphonix™ (Triskem International) and Monophos™ (DSM).

These extraction tests are made until the material M1 and the commercial resins are saturated, proceeding as described above.

Table X below indicates the composition of the aqueous solution used, the volume of the aliquot of this aqueous solution ($V_{solution}$), the mass of the sample of tested material ($M_{sample}$) as well as the values of $Q_U$ and $F \cdot E_{Fe}^{U}$ obtained, for each of the five tested materials.

TABLE X

| | Aqueous solution | | | | | | |
|---|---|---|---|---|---|---|---|
| Material | [H₃PO₄] (mol/L) | [U] (mg/L) | [Fe] (mg/L) | $V_{solution}$ (mL) | $M_{sample}$ (mg) | $Q_U$ (mg/g) | $F \cdot E_{Fe}^{U}$ |
| M1 | 5 | 192 | 1797 | 50 | 50.3 | 58 | 37 |
| Amberlite ™ IRC 747 | 5 | 178 | 1833 | 5 | 52.7 | 4 | 1.3 |
| Lewatit ™ TP 260 | 5 | 192 | 1797 | 5 | 50.7 | 9 | 2 |
| Diphonix ™ | 5 | 191 | 1993 | 5 | 50.9 | 2 | 1.5 |
| Monophos ™ | 5 | 191 | 1993 | 5 | 51.4 | 1 | 1.5 |

This table shows that the material M1 has considerably higher performances in terms of uranium(VI) extraction capacity and selectivity for uranium(VI) regarding iron than commercially available ion-exchange resins.

Comparison with a Material According to Reference [1]:

Extraction tests are also performed to compare the extraction properties of material M1 with those of a material that comprises an SBA-15 type mesoporous silica, functionalised by post-grafting of a plurality of molecules complying with formula (I) in which each of $R^1$ and $R^2$ represents a 2-ethylhexyl group, $R^3$ represents a —CH₂—COOH group, $R^4$ represents an ethyl group while $R^5$ represents a hydrogen atom.

Preparation of this material is described in reference [1].

Extraction tests are made until the two materials are saturated, proceeding as described above.

Table XI below indicates the composition of the aqueous solution used, the volume of the aliquot of this aqueous solution ($V_{solution}$), the mass of the sample of the tested material ($M_{sample}$) as well as the values of $Q_U$ obtained, for each of the two tested materials.

TABLE XI

| | Aqueous solution tested | | | | | |
|---|---|---|---|---|---|---|
| Material | [H₃PO₄] (mol/L) | [U] (mg/L) | [Fe] (mg/L) | $V_{solution}$ (mL) | $M_{sample}$ (mg) | $Q_U$ (mg/g) |
| M1 | 5 | 200 | 2000 | 50 | 49.9 | 51.6 |
| Material of reference [1] | 5 | 200 | 2000 | 50 | 50.1 | 0.5 |

This table shows that the material of the invention has a uranium(VI) extraction capacity that is a hundred times higher than that of a material obtained by post-grafting of an amidophosphonate compound on an inorganic support.

REFERENCES

[1] International application PCT WO 2014/127860
[2] Yamabe et al., *Separation Science and Technology* 2001, 36(15), 3511-3528
[3] Jyo et al, *Journal of Applied Polymer Science* 1997, 63, 1327-1334
[4] Barrett, Joyner and Halenda, *Journal of the American Chemical Society* 1951, 73(1), 373-380

What is claimed is:

1. A mesoporous organic material obtainable by a cross-linking polymerisation of a monomer of formula (I):

in which:
  $R^1$, $R^2$ and $R^3$ represent, independently of each other, a hydrogen atom, a saturated or unsaturated, linear or branched hydrocarbon group comprising 1 to 12 carbon atoms or a polymerisable group comprising at least one unsaturation, provided that at least one of $R^1$, $R^2$ and $R^3$ is a polymerisable group comprising at least one unsaturation;
  $R^4$ and $R^5$ represent, independently of each other, a hydrogen atom or a saturated or unsaturated, linear or branched hydrocarbon group comprising 1 to 8 carbon atoms;
the cross-linking polymerisation being made with a cross-linking agent and one or several blowing agents.

2. The material of claim 1, in which the unsaturation of the polymerisable group is an ethylene unsaturation.

3. The material of claim 2, in which the polymerisable group has formulas (a), (b), (c), (d), (e), (f) or (g):

$$—(CH_2)_q—X \quad\quad (a)$$

$$—(CH_2)_p—C(O)—O—(CH_2)_q—X \quad\quad (b)$$

$$—(CH_2)_p—O—C(O)—(CH_2)_q—X \quad\quad (c)$$

$$—(CH_2)_p—O—C(O)—NH—(CH_2)_q—X \quad\quad (d)$$

$$—(CH_2)_p—O—(CH_2)_q—X \quad\quad (e)$$

—(CH$_2$)$_p$—O—C$_2$H$_5$—(O—C$_2$H$_5$)$_q$—X (f)

—(CH$_2$)$_p$-triazole-(CH$_2$)$_q$—X (g)

in which:
p is an integer from 1 to 6;
q is an integer from 0 to 12; and
X represents a group of formula (i) or (ii):

in which:
R$^a$, R$^b$ and R$^c$ represent, independently of each other, a hydrogen atom or a linear or branched alkyl group comprising 1 to 10 carbon atoms; and represents a covalent bond by which X is bonded to the rest of the group of formula (a), (b), (c), (d), (e), (f) or (g).

4. The material of claim 3, in which X represents a group of formula (II) in which R$^a$, R$^b$ and R$^c$ all three represent a hydrogen atom.

5. The material of claim 4, in which the polymerisable group has formula (a) in which q is from 1 to 4.

6. The material of claim 1, in which:
R$^1$ and R$^2$ represent, independently of each other, a hydrogen atom, a saturated or unsaturated, linear or branched hydrocarbon group comprising 1 to 12 carbon atoms; and
R$^3$ represents a polymerisable group.

7. The material of claim 6, in which:
R$^1$ and R$^2$ are identical to each other and represent a linear or branched alkyl group comprising 1 to 12 carbon atoms; and
R$^4$ and R$^5$ represent, independently of each other, a hydrogen atom or a linear or branched alkyl group comprising 1 to 8 carbon atoms.

8. The material of claim 1, in which the cross-linking agent is a polyvinyl derivative of benzene or of naphthalene.

9. The material of claim 1, in which the cross-linking polymerisation of the monomer is made with a first blowing agent that is an organic solvent in which the monomer and the cross-linking agent are soluble, and a second blowing agent which is a polymer.

10. The material of claim 9, in which the first blowing agent is toluene and the second blowing agent is polyethylene glycol.

11. The material of claim 1, in which the cross-linking polymerisation is an emulsion polymerisation.

12. A method for recovering uranium(VI) from an aqueous medium comprising phosphoric acid and uranium(VI), comprising:

an extraction of uranium(VI) from the aqueous medium by a mesoporous organic material obtainable by a cross-linking polymerisation of a monomer of formula (I):

in which:
R$^1$, R$^2$ and R$^3$ represent, independently of each other, a hydrogen atom, a saturated or unsaturated, linear or branched hydrocarbon group comprising 1 to 12 carbon atoms or a polymerisable group comprising at least one unsaturation, provided that at least one of R$^1$, R$^2$ and R$^3$ is a polymerisable group comprising at least one unsaturation;
R$^4$ and R$^5$ represent, independently of each other, a hydrogen atom or a saturated or unsaturated, linear or branched hydrocarbon group comprising 1 to 8 carbon atoms;
the cross-linking polymerisation being made with a cross-linking agent and one or several blowing agents;
the extraction comprising contacting the aqueous medium with the material, and then separating the aqueous medium from the material; and
a stripping of uranium(VI) from the material obtained at the end of the extraction, the stripping comprising contacting the material with an acid or basic aqueous solution, and then separating the material from the acid or basic aqueous solution.

13. The method of claim 12, in which the aqueous medium comprises 0.01 mol/L to 9 mol/L of phosphoric acid.

14. The method of claim 12, in which the aqueous medium further comprises iron.

15. The method of claim 12, in which the aqueous medium results from an attack of a phosphate ore by sulphuric acid.

16. A method for extracting uranium(VI) from an aqueous medium comprising phosphoric acid and uranium(VI), comprising:
contacting the aqueous medium with a mesoporous organic material obtainable by a cross-linking polymerisation of a monomer of formula (I):

in which:
R$^1$, R$^2$ and R$^3$ represent, independently of each other, a hydrogen atom, a saturated or unsaturated, linear or branched hydrocarbon group comprising 1 to 12 carbon atoms or a polymerisable group comprising at least one unsaturation, provided that at least one of R$^1$, R$^2$ and R$^3$ is a polymerisable group comprising at least one unsaturation;

R⁴ and R⁵ represent, independently of each other, a hydrogen atom or a saturated or unsaturated, linear or branched hydrocarbon group comprising 1 to 8 carbon atoms;

the cross-linking polymerisation being made with a cross-linking agent and one or several blowing agents; and then separating the aqueous medium from the material.

17. The method of claim 16, in which the aqueous medium comprises 0.01 mol/L to 9 mol/L of phosphoric acid.

18. The method of claim 16, in which the aqueous medium further comprises iron.

19. The method of claim 16, in which the aqueous medium results from an attack of a phosphate ore by sulphuric acid.

* * * * *